United States Patent [19]

Maitre

[11] Patent Number: 4,903,030
[45] Date of Patent: Feb. 20, 1990

[54] ANGULAR DISCRIMINATION PROCESS AND DEVICE FOR RADAR

[75] Inventor: Bernard J. Maitre, Elancourt, France

[73] Assignee: Electronique Serge Dassault, Paris, France

[21] Appl. No.: 75,679

[22] Filed: Jul. 2, 1987

[51] Int. Cl.⁴ .................. G01S 13/72; G01S 13/50
[52] U.S. Cl. ........................ 342/113; 342/100; 342/101; 342/147
[58] Field of Search ............... 244/3.19; 342/62, 81, 342/82, 83, 84, 110, 113, 146, 147, 156.9

[56] References Cited

U.S. PATENT DOCUMENTS 4,549,184 10/1985 Boles et al. .................. 342/107 X

OTHER PUBLICATIONS

R. A. Cherwek, "Coherent Active Seeker Guidance Concepts for Tactical Missiles", Eascon Conf. 1978, Arlington, VA, IEEE.

Primary Examiner—Thomas H. Tarcza
Assistant Examiner—Gilberto Barrón, Jr.
Attorney, Agent, or Firm—Herbert Dubno

[57] ABSTRACT

In a process and device for the angular discrimination of targets by airborne radar, the angular position of a point on the ground is ascertained as a function of the Doppler frequency of an echo signal relating to the point under consideration, as determined by passband filtering the echo signals.

The Doppler frequencies are selected by a bank of filters and an angular determination is made by analyzing signals including a signal representing the position in the bank of that filter selecting the Doppler frequency of the echo signal, and a reference frequency subject to closed loop control and representing the true Doppler frequency of the ground. Means are provided for maintaining data relating to the position and the range of the target constant during the process of analysis.

25 Claims, 2 Drawing Sheets

ANGULAR DISCRIMINATION PROCESS AND DEVICE FOR RADAR

FIELD OF THE INVENTION

This invention relates to a process and device for the angular discrimination of targets by airborne radar.

BACKGROUND OF THE INVENTION

In many radar apparatuses, the angular discrimination between two points is provided by the spatial selection given by the scanning radioelectric beam. The discriminating capability therefore corresponds to the width of the beam.

SUMMARY OF THE INVENTION

In accordance with the invention, an angular discrimination between points on the ground observed by a coherent pulse radar carried by a flying missile is achieved by making use of the Doppler frequencies associated with the pairs formed on the one hand by the radar antenna and on the other hand the points on the ground illuminated by the radar beam.

A process in accordance with the invention applies the relationship which exists between the Doppler frequency corresponding to a point and the angle which the straight line connecting the antenna with the said point forms with the vector representing the velocity of the missile carrying the radar, which is:

$$F_d = \frac{2V}{\lambda} \cos \alpha \qquad (1)$$

in which:
$F_d$ is the Doppler frequency,
V is the velocity of the flying missile,
$\alpha$ is the angle between the velocity vector of the flying missile and the straight line connecting the missile to the said point,
$\lambda$ is the wavelength.

Doppler frequencies can be selected with extreme precision so that the implementation of the process leads to a very fine angular discrimination.

The Doppler frequencies are selected by means of a filter or a bank of filters.

Since the fineness of the analysis of the received echoes becomes greater as the pass band of the filter or filters becomes narrower and the analysis time required by a filter becomes longer as the pass band becomes narrower, the invention may provide means enabling the analysis to be carried out for as long a period as required.

For this purpose it is preferred to maintain the factors used in the determination of the Doppler frequency, and which would otherwise vary during the analysis time, at a constant value throughout the analysis period. These factors are the geometric factors relating the missile and the point to be discriminated.

Accordingly, the radar transmission frequency may be varied as a function of the velocity of the missile and of the angle between the velocity vector and the direction of the point aimed at.

The invention also preferably provides means for maintaining the range data at a constant value throughout the analysis time, despite the movement of the missile.

According to another aspect of the invention, the discriminating power of the equipment may be maintained at a constant value despite the variation in the velocity V of the missile and of the angle between the antenna and the vector representing the said velocity.

The invention may thus provide for variation of the pass bandwidth of the filter as a function of a factor affecting the width of the spectrum, namely the velocity of the missile.

The invention may also provide for the use of a frequency selection filter whose pass bandwidth varies with the direction of the antenna.

The frequency analysis is preferably carried out using a bank of filters, thus enabling an increase in the scanning speed of the antenna with respect to an equipment including a single filter.

This bank of filters is preferably produced in the known way by an FFT (Fast Fourier Transform) algorithm or one of its derivatives, over N points, if N is the number of pulses received during an analysis period.

At the start of each analysis time, a reference oscillator is preset from the error voltage provided by a discriminator placed at the output of the bank of filters.

This presetting is carried out on the true Doppler frequency of the ground.

BRIEF DESCRIPTION OF THE DRAWING

The above and other objects, features and advantages of the present invention will become more readily apparent from the following description, reference being made to the accompanying highly diagrammatic drawing in which.

SPECIFIC DESCRIPTION

Figure 1:
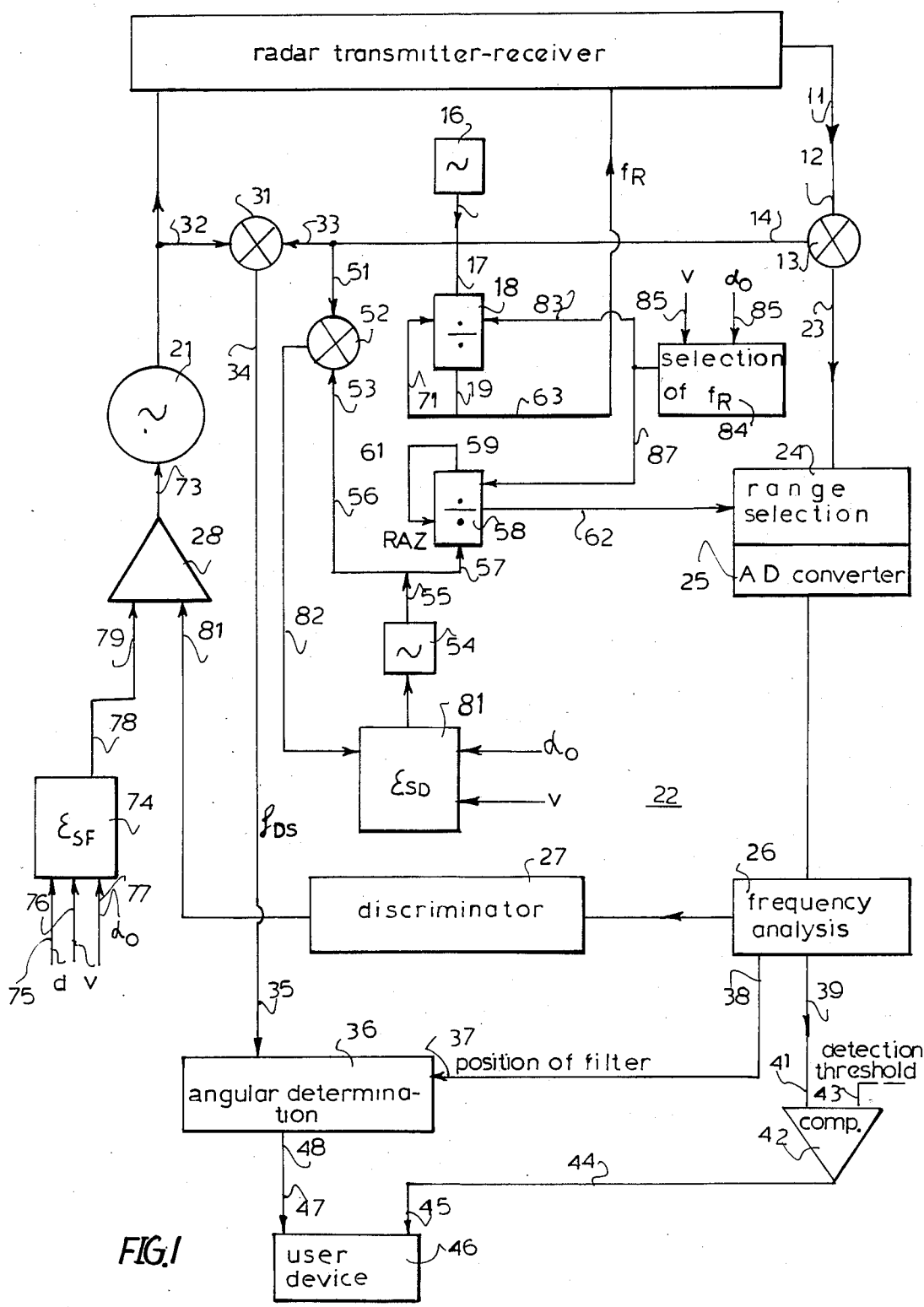
FIG. 1 is a diagrammatic representation, in block diagram form, of a device according to one embodiment of the invention.

The mean frequency of a coherent pulse radar receiver and scanning beam antenna is applied by a circuit 11 to the input 12 of a demodulator 13. This demodulator has a second input 14 connected to the output 15 of a demodulating oscillator 16. On a second path 17 of the output of the oscillator 16 is a frequency divider 18 whose output 19 controls the triggering of the radar transmission pulses at the recurrence frequency $f_R$.

The radar microwave energy is controlled by a second oscillator 21. This oscillator is part of a loop 22 including the radar beam and the reflected echo as well as the demodulator 13, the output circuit 23 of this demodulator, a range selection device 24, a frequency analysis device 26, a frequency discriminator 27, which provides an error signal for the closed loop control of the frequency of the oscillator 21, a summer 28 and then up to the oscillator 21. Following the range selection device 24 there is provided an analog/digital converter 25 thus enabling the use of digital technology.

The frequency analysis device 26 advantageously includes means for generating a battery of filters according to an FFT algorithm (Fast Fourier Transform).

A demodulator 31 receives at its input 32 the oscillations provided by the master oscillator 21 and the oscillations provided by the oscillator 16 on its other input 33. The output 34 of the demodulator 31 is connected to the input 35 of an angular determination device 36. A second input 37 of the said device is connected to the output 38 of the frequency analysis device 26.

Another output 39 of the frequency analysis device 26 is connected to an input 41 of a comparator 42 whose second input 43 receives a signal that is adjustable according to a desired detection threshold. The output 44 of the comparator 42 is applied to an input 45 of a user device 46 whose other input 47 is connected to the output 48 of the angular determination device 36.

The oscillations provided by the demodulation oscillator 16 are applied by a circuit 51 to the input of a third demodulator 52, which receives on its other input 53 the oscillations provided by a third oscillator or telemetry oscillator 54. The output 55 of this telemetry oscillator is divided, as well as into the branch 56 leading to the demodulator 52, into a second branch 57 leading to a frequency divider 58. A first output 59 of this frequency divider resets the divider 58 to zero through a circuit 61, as indicated by the label "RAZ". A second output 62 of the frequency divider 58 is connected to the range selection device 24.

Similarly, the frequency divider 18 has its output 19 divided up into a first branch 63 and a second branch 71 for resetting the divider 18 to zero.

The dividers 18 and 58 introduce the same division factor.

Figure 2:
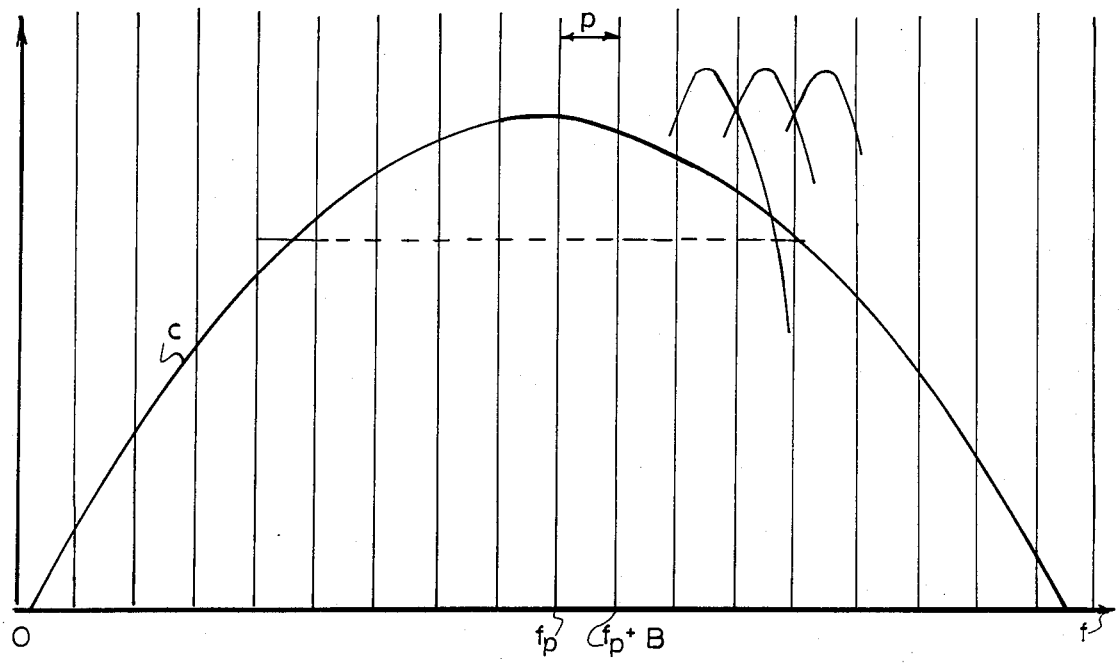
FIG. 2 shows a frequency spectrum.

If a diagram of the frequency spectrum is plotted, as in FIG. 2, with the various frequencies on the horizontal axis and the amplitudes on the vertical axis, there is obtained for the area of ground illuminated at a given time and at a given range by the radar carried by the missile, a curve like that shown at C.

With each of the filters produced by the frequency analysis device 26 there corresponds a frequency slot whose origins are referenced $f_p$, $f_p+B$, B being the width of the passband of the filter concerned, in position p in this case.

In the upper part of FIG. 2 there is a diagrammatic representation of the actual characteristic curves of several filters.

Figure 3:
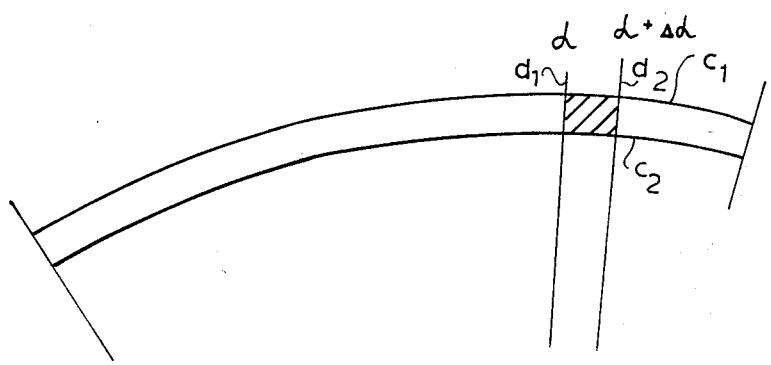
FIG. 3 is a diagram relating to the discriminating power.

With each of the bands defined by the filters of the analysis device 26 there corresponds an area of ground, as represented for example in FIG. 3, limited on the one hand by arcs of circles $c_1$, $c_2$ representing range, and on the other hand by almost straight curves, $d_1$ and $d_2$, corresponding with two angular values $\alpha$ and $\alpha+\Delta\alpha$ based upon the formula:

$$f_p = \frac{2V}{\lambda} \cos \alpha \tag{2}$$

$$f_p + B = \frac{2V}{\lambda} \cos (\alpha + \Delta\alpha) \tag{2'}$$

In these formulae:
V represents the velocity of the missile,
$\lambda$ is the wavelength of the transmitted energy,
$\alpha$ is the angle between the velocity vector of the missile and the direction of the considered point on the ground.
B is the width of the filter's passband,
p is the position of the filter,
$f_p$ is the lower limit of the passband of the filter.

When a characteristic signal of filter position p is applied to the input 37 of the angular determination device 36, and the value of the Doppler frequency is applied to the said measuring device at its input 35, the device 36 produces the angle $$\frac{\alpha + \Delta\alpha}{2}$$

which is present at the output 48.

The device 36 has two other inputs to which are applied signals representing, on the one hand, the velocity V and, on the other hand, the recurrence frequency $f_R$.

The signal present at the output 44 validates the data provided by the user device 46 depending on whether the energy present in the filter is greater or not greater than a threshold value applied to input 43 of device 42.

As the fineness of analysis depends on the width of the passband of the filters, and therefore on the analysis time, the invention provides means allowing the device to operate throughout the analysis time. For this purpose, it provides for the stabilizing, i.e. the maintaining at a constant value, throughout the whole of the analysis time, of the values of the factors on which the measurements for angular discrimination depend.

The frequency of the oscillator 21 is, for this purpose of stabilization, controlled at its input 73 by a control device 74 which receives on its inputs 75, 76 and 77, signals representing the range of the point d, the velocity V of the missile and the angle $\alpha_O$ between the velocity vector of the missile and the direction of the point at the start of the measuring time respectively.

If d is the range of the point and $\alpha$ is the value of the angle between the velocity vector and the direction of the point at time t, $d_O$ and $\alpha_O$ being these values at the initial moment of taking samples into account, then:

$$d \cos \alpha = d \cdot \cos \alpha_O - V \cdot t \tag{3}$$

$$d_O - d = V \cdot \cos \alpha_O \cdot t \tag{4}$$

from which the following is obtained:

$$F_{ds} = F_{dsO} - \frac{2V^2}{\lambda d} \sin^2 \alpha_O t \tag{5}$$

In this formula:
$F_{ds}$ is the Doppler frequency of the ground echoes at time t,
$F_{dsO}$ is the Doppler frequency at the time of origin.

The stabilization of the Doppler frequency of the ground echoes is carried out by applying, by circuit 78, the signal produced by the device 78 to the second input 79 of the summer 28 whose first input 81 is connected to the output of the discriminator 27. The correction $\epsilon sF$ applied to the oscillator 21 is thus of the form:

$$\epsilon sF = \frac{2V^2}{\lambda d} \sin^2 \alpha_O t$$

Range stabilization is carried out by frequency shifting the oscillator from which are taken the frequencies used for telemetry, oscillator 54 in the example.

This oscillator is in this case distinct from the oscillator used for producing the recurrence frequencies, i.e. oscillator 16 in this case.

If $T_R$ designates the time interval between two pulses, the following can be written:

$$d_o - d = \left(\frac{1}{F_R} - \frac{1}{F_R + \Delta F_R}\right) \cdot N \cdot \frac{c}{2} = V \cos d_O N\, T_R.$$

In this formula:
N is the number of pulses received in a measuring time,
c is the speed of light,
$F_R$ is the recurrence frequency.
This expression can be written:

$$\frac{\Delta F_R}{F_R} = \frac{2V}{c} \cos \alpha_O.$$

A signal is applied to the basic oscillator, oscillator 54 in this case, by a device 81, which introduces a shift $\Delta F_O$ or $\epsilon_S D$ such that:

$$\epsilon_S D = \frac{2V}{c} \cos \alpha_O \cdot F_O$$

$F_O$ being the frequency of oscillation of the oscillator 16, the control of the oscillator 54 being thus obtained by control in a closed loop which includes, apart from the device 81 and the oscillator 54, a circuit 82, the demodulator 52 and the circuit 56.

The width of the spectrum of ground echoes depends on the position of the antenna with respect to the velocity vector of the missile. In order to make the angular discriminating power of the device constant, means are provided of varying the width of the passband of the filter as a function of the position of the antenna.

According to one embodiment, the recurrence frequency is slaved to the position of the antenna such that the spectral width of the ground echoes is always less than or equal to half of the recurrence frequency.

The variation of the division factor is such that the recurrence frequency complies with the following formula:

$$f_R \geqq \frac{4V}{\lambda} \sin \Delta G$$

in which:
V is the velocity of the missile,
λ is the wavelength of the transmitted energy,
G is the angle between the axis of the electrical energy beam and the velocity vector vector of the missile,
ΔG is the angle of divergence of the said beam.

This is the embodiment which is shown in the drawing. The division chain which the frequency divider 18 includes is switched by a signal applied to an input 83 of the divider 18 and which comes from a control device 84 on the inputs 85 and 86 of which are applied signals representing B on the one hand and $\alpha_O$ on the other hand.

A second output 87 of the device 84 is connected to the frequency divider 58 which is interposed in the telemetry chain ending at the range selector 24.

As the recurrence frequency is variable, the time $T_F$ of taking the N samples used in the analysis into account is variable.

Consequently, the scanning speed of the antenna is made variable so that the time of illumination of the echo is always greater than the analysis time $T_F$.

What is claimed is:
1. A process for the angular discrimination, by a coherent pulse radar carried by a flying missile, of close terrestrial points, which comprises the steps of:
   (a) determining Doppler frequency of close terrestrial points to be discriminated between by narrow passband filtering of the frequencies;
   (b) making an angular determination of the points by analysis based on the determined Doppler frequencies during a period of analysis; and
   (c) during the period of said analysis, maintaining the Doppler frequency to be determined at its initial value.
2. The process defined in claim 1 wherein, in order to maintain the Doppler frequency constant during the analysis period, the transmitted radar oscillation frequency is modified.
3. The process defined in claim 2 wherein the variation in the frequency of the oscillator is such as to take account of the velocity of the missile, of the target range and of the angle between the velocity vector and the direction of the target.
4. The process defined in claim 3 wherein transmitted radar frequency of the coherent pulse radar is modified in accordance with the formula:

$$\epsilon_{sF} = \frac{2V^2}{\lambda \cdot d} \sin^2 \alpha_O t$$

in which:
$\epsilon_{sF}$ is the modification in the transmitted frequency
V is the velocity of the missile,
λ is the wavelength of the transmitted energy,
d is the distance between the missile and the point,
$\alpha_O$ is the angle between the velocity vector of the missile and the direction of the point at the measurement start time, and
t is the time elapsed since the start time.
5. The process defined in claim 4 wherein the said modification is superimposed on a closed loop control of the transmitted radar frequency.
6. The process defined in claim 1 wherein in order to maintain the Doppler frequency constant during the analysis period a frequency of a demodulation oscillator of a radar receiver is modified.
7. The process defined in claim 1 wherein for the purpose of maintaining the angular discrimination of the radar constant, the width of the passband of a filter for the narrow passband filtering is varied as a function of the direction of the antenna.
8. The process defined in claim 1 wherein, for the purpose of maintaining the angular discrimination of the radar constant, the width of the passband of a filter for the narrow passband filtering is varied as a function of the velocity of the missile.
9. The process defined in claim 8 wherein the coherent pulse radar generates pulses at a recurrence frequency and the recurrence frequency of the pulses is slaved to the position of the antenna.
10. The process defined in claim 9 wherein the variation of the recurrence frequency is obtained by modifying a division ratio of the demodulation oscillator frequency.
11. The process defined in claim 10 wherein the variation in the division ratio is such that the recurrence frequency complies with the following formula:

$$f_R \gtrsim \frac{4V}{\lambda} \sin G \, \Delta G$$

in which:
V is the velocity of the missile,
λ is the wavelength of the transmitted energy
G is the angle between the velocity vector of the missile and the axis of the radioelectric energy beam and the direction of the point, and
ΔG is the divergence angle of the said beam.

12. The process defined in claim 9 wherein the antenna has a scanning speed which is varied as a function of the recurrence frequency.

13. The process defined in claim 2 wherein, during the period of said analysis, the data relating to the target range is maintained at a constant value.

14. The process defined in claim 13 wherein, in order to maintain the data relating to the target range constant, the frequency of a range-gating control oscillator is varied.

15. The process defined in claim 14 wherein the frequency of the telemetry control oscillator is modified by an amount defined by the following formula:

$$\epsilon_{sd} = \frac{2V}{c} \cos \alpha_0 \, F_0$$

in which:
$\epsilon_{sd}$ is the frequency modification,
V is the velocity of the missile,
c is the speed of light,
$\alpha_O$ is the angle between the velocity vector of the missile and the direction of the point at the measurement start time and,
$F_O$ is the frequency of the demodulation oscillator.

16. A coherent pulse radar device for use in an airborne craft to discriminate the angular positions of close terrestrial points relatively to the velocity vector of the craft, said device comprising passband filtering means for determining the Doppler frequencies associated with pairs formed by the radar antenna and by the points on the ground illuminated by the radar beam, and means for analyzing said Doppler frequencies to determine the angular positions of said points, said passband filtering means comprising a bank of passband filters and said analyzing means is arranged to compare signals representing the position within the bank of filters of that filter which passes the Doppler frequency corresponding to the point under consideration and a signal from a reference oscillator and corresponding to the true Doppler frequency of the ground, said reference oscillator being provided with means enabling it to be reset for each operation of said analyzing means, by means of a discriminator responsive to the output from said bank of filters.

17. A coherent pulse radar device for use in an airborne craft to discriminate the angular positions of close terrestrial points relatively to the velocity vector of the craft, said device comprising passband filtering means for determining the Doppler frequencies associated with pairs formed by the radar antenna and by the points on the ground illuminated by the radar beam, and means for analyzing said Doppler frequencies to determine the angular positions of said points, stabilizing means being provided for maintaining said Doppler frequencies constant during each analyzing period.

18. The device defined in claim 17 wherein said stabilizing means comprises means for varying the oscillation frequency of the transmitted radar.

19. The device defined in claim 18 wherein means is provided to enable variation in the frequency of the oscillator is such as to take account of the velocity of the missile, of the target range and of the angle between the velocity vector and the direction of the target.

20. The device defined in claim 19 wherein means is provided for modifying the transmitted radar frequency in accordance with the formula:

$$\epsilon_{sF} = \frac{2V^2}{\lambda \cdot d} \sin^2 \alpha_O t$$

in which:
$\epsilon_{sF}$ is the modification in the transmitted frequency,
V is the velocity of the missile,
λ is the wavelength of the transmitted energy,
d is the distance between the missile and the point,
$\alpha_O$ is the angle between the velocity vector of the missile and the direction of the point at the measurement start time, and
t is the time elapsed since the start time.

21. The device defined in claim 18 wherein means is provided to control said oscillation frequency in a closed loop including said filtering means and a variable frequency reference oscillator, and the said stabilizing means is arranged to superimpose a variation of the frequency of said reference oscillator upon any variation derived from said closed loop control.

22. A coherent pulse radar device for use in an airborne craft to discriminate the angular positions of close terrestrial points relatively to the velocity vector of the craft, said device comprising passband filtering means for determining the Doppler frequencies associated with pairs formed by the radar antenna and by the points on the ground illuminated by the radar beam, and means for analyzing said Doppler frequencies to determine the angular positions of said points, means being provided for varying a recurrence frequency of the transmitted radar pulse in accordance with the position of the radar antenna.

23. The device defined in claim 22 wherein the said means for varying said recurrence frequency comprises a frequency divider arranged to divide the frequency of a demodulation oscillator of the radar by a division ratio that varies with the position of the radar antenna.

24. A coherent pulse radar device for use in an airborne craft to discriminate the angular positions of close terrestrial points relatively to the velocity vector of the craft, said device comprising passband filtering means for determining the Doppler frequencies associated with pairs formed by the radar antenna and by the points on the ground illuminated by the radar beam, and means for analyzing said Doppler frequencies to determine the angular positions of said points, said device including a stabilizing means for maintaining data relating to target range constant.

25. The device defined in claim 24 wherein said stabilizing means comprises means for varying the frequency of a range-gating control oscillator of said radar device.

* * * * *